United States Patent [19]

Haar et al.

[11] Patent Number: 5,141,687
[45] Date of Patent: Aug. 25, 1992

[54] SINTERING DEVICE AND PROCESS FOR THE MANUFACTURE THEREOF

[75] Inventors: Wilhelm Haar, Sandhausen; Guido Weber, Oftersheim; Alois Lechner, Helmstadt-Bargen, all of Fed. Rep. of Germany

[73] Assignee: Asea Brown Boveri Aktiengesellschaft, Mannheim, Fed. Rep. of Germany

[21] Appl. No.: 534,047

[22] Filed: Jun. 6, 1990

[30] Foreign Application Priority Data

Jun. 24, 1989 [DE] Fed. Rep. of Germany ...... 3920851

[51] Int. Cl.⁵ .............................................. C04B 35/10
[52] U.S. Cl. ...................................... 264/63; 264/56; 264/66
[58] Field of Search .............................. 264/63, 56, 66

[56] References Cited

U.S. PATENT DOCUMENTS

| 3,026,210 | 3/1962 | Coble | 264/56 |
| 4,193,857 | 3/1980 | Bannister | 264/63 |
| 4,364,783 | 12/1982 | Theodore | 264/63 |
| 4,629,593 | 12/1986 | Groh | 264/63 |
| 4,999,145 | 3/1991 | Thibodeau | 264/63 |

Primary Examiner—James Derrington
Attorney, Agent, or Firm—Herbert L. Lerner; Laurence A. Greenberg

[57] ABSTRACT

A sintering device for the production of cupular solid electrolytes, which are used to separate anode and cathode compartments in sodium-sulphur cells, is in the form of a jacket tube and is produced from two or more metal oxides or metal hydroxides. The device and method avoid the disadvantages of the prior art sintering devices that are costly to manufacture and in most cases destroy the uniform distribution of the sodium within the soilid electrolyte material.

2 Claims, 1 Drawing Sheet

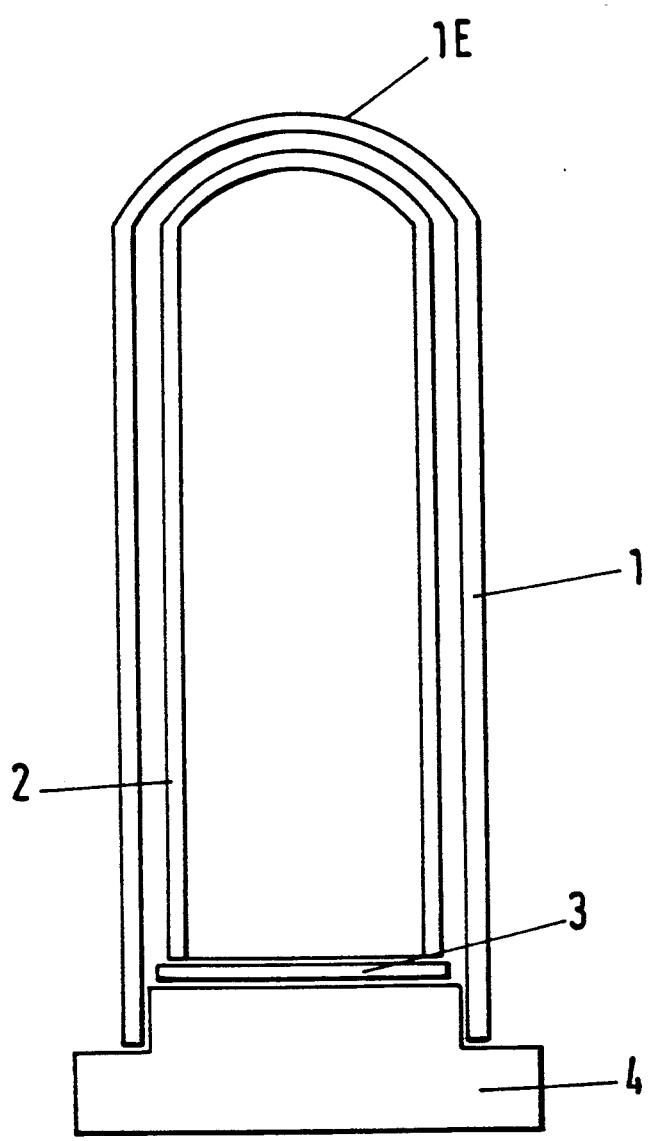

SINTERING DEVICE AND PROCESS FOR THE MANUFACTURE THEREOF

The invention relates to a sintering device for the production of ion-conducting solid electrolytes in the form of hollow cylinders being closed at one end, as well as to a process for the manufacture of the sintering device.

Such sintering devices are preferably used in the production of shaped articles. A particular field of application of the sintering devices is the production of ion-conducting solid electrolytes used in sodium-sulphur storage cells. Such ion-conducting solid electrolytes are produced from beta-aluminum oxide by sintering. Most of the sodium-sulphur storage cells in use today are cupular in shape. The solid electrolyte used to separate the anode and cathode compartments of the storage cell is also cupular or cup-shaped and the inner region thereof serves as the reactant compartment. In order to perform its tasks satisfactorily, the solid electrolyte must have a high ion conductivity, a high density and a high strength, so that particular care must be exercised in the production thereof. The solid electrolytes are produced by using sodium ion-conducting beta-aluminum oxide being formed primarily of 80 to 95% aluminum oxide and 5 to 12% sodium oxide.

In oxide ceramic technology, it is conventional to relate the proportions of the components of the composition to the oxides of the metals being present. It is obvious from such composition data that, in contrast to alpha-aluminum oxide, for instance, beta-aluminum oxide is not a structural modification of the chemical compound aluminum oxide. The misleading name beta-aluminum oxide is of historical origin. Sodium oxide or chemically related compounds such as other alkali metal oxides, alkaline earth metal oxides, silver oxide, water or other hydrogen-containing compounds are an essential constituent of that ceramic base material.

There are at least four different beta-aluminum oxide structures, namely beta', beta'', beta''' and beta''''-$Al_2O_3$, which have the common feature of being composed of several successive, densely packed oxygen layers separated in blocks by two-dimensional parallel layers of reduced oxygen content. In addition to oxygen ions, the intermediate layers contain the mobile ions essential for the use of beta-aluminum oxide as a solid electrolyte. The beta and beta''-alpha-aluminum oxide phases are preferred among the phases mentioned above.

In order to obtain the high ion conductivity of the solid electrolyte and the other above-mentioned properties in the production of the solid electrolyte, the material must be very homogeneous. In the production of solid electrolytes, however, inhomogeneities have so far always been formed in the ceramic due to external influences in the form of chemical reactions, e.g. with the auxiliaries used for its production. Moreover, when the ceramic is sintered without a suitable protective jacket, evaporation occurs which destroys the uniform distribution of the sodium within the solid electrolyte material. That leads to internal stresses and therefore to deformation of the electrolyte tubes. Heretofore it was conventional for the solid electrolyte blank produced from the ceramic material to be embedded, prior to sintering, in coarse-grained powder of sodium beta-aluminum oxide. That process is very complicated to perform because the embedding of the solid electrolyte blank in the coarse-grained powder is very costly and time-consuming. The preparation of the coarse-grained powder and the production of a vessel which is stable towards sodium vapor represent additional costs.

It is accordingly an object of the invention to provide a sintering device and a process for the manufacture thereof, which overcome the hereinafore-mentioned disadvantages of the heretofore-known methods and devices of this general type and which provide an economical sintering device that ensures the production of a solid electrolyte with a uniform distribution of sodium in the ceramic material.

With the foregoing and other objects in view there is provided, in accordance with the invention, a sintering device for the production of ion-conducting solid electrolytes in the form of hollow cylinders being closed at one end, comprising a jacket tube being closed at one end, the jacket tube being produced from at least two substances selected from the group consisting of metal oxides and metal hydroxides.

In accordance with another feature of the invention, the jacket tube is produced from alpha-aluminum oxide and a substance selected from the group consisting of magnesium oxide and magnesium hydroxide, and the jacket tube has dimensions being a few millimeters larger than the dimensions of the solid electrolyte to be produced.

In accordance with a further feature of the invention, the jacket tube is produced from a material containing $Al_2O_3$ and a substance selected from the group consisting of MgO and $Mg(OH)_2$ in a molar ratio of from 1:1.80 to 1:1.05.

With the objects of the invention in view there is also provided a process for the manufacture of a sintering device, which comprises homogenizing and comminuting at least one substance from the group consisting of a metal oxide and a metal hydroxide of a metal from group 2 and at least one metal oxide of a metal from group 13 of the periodic table of the elements, according to the new IUPAC recommendation, to a powder of a defined particle size, calcining the powder at a defined temperature, then comminuting the powder to form a finer-grained powder and then suspending the powder in water together with dispersants and pressing aids and stirring to form a slip, then processing the slip to form pourable granules, compressing the granules in an isostatic press to form a jacket tube and sintering the jacket tube in a furnace at a defined temperature.

In accordance with another mode of the invention, there is provided a process which comprises performing the homogenizing and comminuting step by homogenizing magnesium oxide and alpha-aluminum oxide in a molar ratio of substantially from 1:1.05 to 1:1.80 and comminuting to form a powder with a particle size at most equal to 1 $\mu$m.

In accordance with a further mode of the invention, there is provided a process which comprises performing the homogenizing and comminuting step by homogenizing magnesium hydroxide and alpha-aluminum oxide in a molar ratio of substantially from 1:1.05 to 1:1.80 and comminuting to form a powder with a particle size at most equal to 1 $\mu$m.

In accordance with an added mode of the invention, there is provided a process which comprises calcining the powder at a temperature of substantially 1250° C., then comminuting the powder in a mill to form a powder with a particle size at most equal to 5 $\mu$m, preferably approximately 0.5 $\mu$m, and suspending the powder in water with dispersants, plasticizers and binders, stirring to form a slip and then processing by spray-drying to form pourable granules with a particle size of substantially from 0.1 to 250 μm.

In accordance with a concomitant mode of the invention, there is provided a process which comprises performing the compressing step by compressing the granules at a pressure of approximately 200 MPa in the isostatic press to form a jacket tube with a wall thickness of substantially between 2 mm and 4 mm, and performing the sintering step at a temperature above 1700° C.

According to the invention, a jacket tube having internal dimensions which approximately match the desired external dimensions of the shaped article to be produced, is used as the sintering device. The jacket tube itself is produced from a material which is formed of the oxide or hydroxide of a metal from group 2 and the oxide of a metal from group 13, of the periodic table of the elements according to the new IUPAC recommendation. The material used contains the metal oxides in a molar ratio of from 1:1.04 to 1:1.80. The sintering device is preferably manufactured by using magnesium oxide and alpha-aluminum oxide or magnesium hydroxide and alpha-aluminum oxide. The starting materials are first ground to form a powder with a particle size of less than 1 μm. This powder is then calcined at a temperature of 1250° C. When subjected to phase analysis by means of X-ray diffraction, the powder obtained by this process shows essentially only the lines for MgO-.Al$_2$O$_3$ spinel and weak lines for MgO. In the composition range indicated, the excess MgO is predominantly dissolved in the spinel lattice (solid-solution region). This powder is comminuted again and then suspended in water with suitable dispersants, plasticizers and pressing aids and stirred to form a slip, which is then processed to form pourable granules, e.g. by means of spray-drying. These granules are then compressed in an isostatic press to form a jacket tube with wall thicknesses of between 2 and 4 mm. The compact, molded piece or pressed article is then sintered at a temperature of between 1650 and 1800° C., and preferably at 1700° C.

Other features which are considered as characteristic for the invention are set forth in the appended claims.

Although the invention is illustrated and described herein as embodied in a sintering device and process for its manufacture, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawing.

The drawing is a diagrammatic, elevational view of the device according to the invention.

Referring now to the single figure of the drawing in detail, there is seen a jacket tube forming a sintering device 1. The jacket tube forming the device 1 is in the shape of a cupular or cup-shaped hollow body with a wall thickness of 2 to 4 mm. Inserted in the jacket tube forming the sintering device 1 is a blank 2 of a solid electrolyte, which is also cupular in shape. The internal dimensions of the jacket tube forming the sintering device 1 are chosen in such a way that there is a gap of 1 to 4 mm between the inner periphery of the sintering device and the outer surface of the blank 2. In the case of solid electrolytes blanks 2 used in non-illustrated sodium-sulphur cells, the closed ends are convex and form a spherical cap. Correspondingly, the closed end 1E of the jacket tube forming the sintering device 1 is also convex.

In the illustrated embodiment example, the jacket tube forming the sintering device 1 is produced from a material containing magnesium oxide and aluminum oxide. According to the invention, MgO and Al$_2$O$_3$ are present in a molar ratio of from 1:1.04 to 1:1.80. The outer diameter of the jacket tube forming the sintering device 1 illustrated in the figure is approximately 40 mm. The inner diameter of the jacket tube forming the sintering device 1 is approximately 36 mm. In the illustrated embodiment, the jacket tube serving as the sintering device has a maximum height of 320 mm. In order to manufacture the jacket tube forming the sintering device 1, magnesium oxide and alpha-aluminum oxide are mixed in a molar ratio of from 1:1.04 to 1:1.80 and ground to form a powder with a particle size of less than or equal to 1 μm. It is also possible to use magnesium hydroxide and alpha-aluminum oxide in the same molar ratio. The powder is then calcined at a temperature of 1250° C. The powder formed by this process is comminuted again in a mill to form a powder with a particle size of less than or equal to 5 μm. This powder is stirred in water together with dispersants, pressing aids and binders. Polycarboxylic acids, polyglycols and polywaxes are preferably used as dispersants, pressing aids and binders. A low-viscosity slip with a solids content of between 50 and 70% is formed by stirring the powder with the dispersants and pressing aids. The slip is processed in a device provided for this purpose, e.g. non-illustrated a spray-dryer, to form pourable granules with a particle size of 0.1-250 μm. The granules are then compressed in an isostatic press to form the jacket tube 1 illustrated in the figure, with a wall thickness of between 2 mm and 4 mm. A pressure of 200 MPa is preferably used for this purpose. The compact, molded piece or pressed article formed in this way is then sintered at a temperature of preferably 1700° C. After sintering, the jacket tube forming the sintering device 1 is finished and can be used for producing solid electrolytes and especially for sintering them. The density of the jacket tube forming the sintering device 1 manufactured in this way is greater than 3.50 g/cm$^3$. It should preferably be 3.55 g/cm$^3$. The jacket tube 1 is hermetically impervious. In a test performed with helium, the helium leakage rate was found to be less than $10^{-12}$ MPa.liter/s. A blank 2 produced from ceramic beta"-aluminum oxide powder can then be inserted in the jacket tube forming the sintering device 1, with the blank 2 being placed on a firing base 3 made of the same material, which shrinks with the blank. The base in turn sits on a plug 4 made of the same material as the jacket tube.

Since it is resistant to the effects of alkali metals, the material used to manufacture the jacket tube forming the sintering device 1 can also be used in the form of suitable vessels, for the production of shaped articles in glass manufacture, or as a dirt tube for thermocouples in alkali-containing atmospheres at temperatures up to 1600° C.

We claim:

1. Process for manufacturing a sintering device for the production of ion-conducting solid electrolytes, which comprises homogenizing magnesium oxide and alpha-aluminum oxide in a molar ratio of substantially from 1:1.05 to 1:1.80 and comminuting to form a powder with a particle size at most equal to 1 μm, calcining the powder at a temperature of substantially 1250° C., then comminuting the powder in a mill to form a powder with a particle size at most equal to 5 μm, and suspending the powder in water with dispersants, plasticizers and binders, stirring to form a slip and then processing by spray-drying to form pourable granules with a particle size of substantially from 0.1 to 250 μm, compressing the granules at a pressure of approximately 200 MPa in an isostatic press to form a jacket tube with a wall thickness of substantially between 2 mm and 4 mm, and sintering at a temperature above 1700° C.

2. Process for manufacturing a sintering device for the production of ion-conducting solid electrolytes, which comprises homogenizing magnesium hydroxide and alpha-aluminum oxide in a molar ratio of substantially from 1:1.05 to 1:1.80 and comminuting to form a powder with a particle size at most equal to 1 μm, calcining the powder at a temperature of substantially 1250° C., then comminuting the powder in a mill to form a powder with a particle size at most equal to 5 μm, and suspending the powder in water with dispersants, plasticizers and binders, stirring to form a slip and then processing by spray-drying to form pourable granules with a particle size of substantially from 0.1 to 250 μm, compressing the granules at a pressure of approximately 200 MPa in an isostatic press to form a jacket tube with a wall thickness of substantially between 2 mm and 4 mm, and sintering at a temperature above 1700° C.

* * * * *